US006560836B1

(12) United States Patent
Briscoe

(10) Patent No.: US 6,560,836 B1
(45) Date of Patent: May 13, 2003

(54) HAND TOOL FOR EXTRACTING BOLTS

(76) Inventor: Richard Briscoe, 519 Leona St., Morgan City, LA (US) 70380

(*) Notice: Subject to any disclaimer, the term of this patent is extended or adjusted under 35 U.S.C. 154(b) by 0 days.

(21) Appl. No.: 10/194,176

(22) Filed: Jul. 11, 2002

(51) Int. Cl.[7] .......... B23P 19/04
(52) U.S. Cl. .......... 29/259
(58) Field of Search .......... 29/426.5, 256, 29/261, 257–262, 252, 237, 271, 272, 239; 228/99.3; 269/43, 45

(56) References Cited

U.S. PATENT DOCUMENTS

| | | | | | |
|---|---|---|---|---|---|
| 1,504,037 | A | * | 8/1924 | Furman | 29/259 |
| 4,510,661 | A | * | 4/1985 | Campa | 29/259 |
| 4,540,199 | A | * | 9/1985 | Neill | 285/27 |
| 4,624,449 | A | * | 11/1986 | Gentry | 254/131 |
| 5,129,136 | A | * | 7/1992 | Richardson | 29/426.5 |
| 5,177,852 | A | * | 1/1993 | James | 29/259 |
| 5,390,404 | A | * | 2/1995 | Rubino et al. | 29/259 |
| 5,560,091 | A | * | 10/1996 | Labit | 29/272 |

* cited by examiner

*Primary Examiner*—Timothy V. Eley
*Assistant Examiner*—Daniel Shanley

(57) ABSTRACT

The hand tool for extracting bolts is a specialized marine oriented bolt extractor for use in extracting what are commonly called "Body Bound Bolts" from motor vessel shaft couplings. The body of the bolt extractor would be made of heavy duty steel and comprises a stationary flange and a moving flange. Located on the front side of the stationary flange are two cylindrical bolt housings for the bound bolts and two cylindrical extractor rod housings. The extractor rod housings pass through both flanges and house the 180 degree hook shaped extractor rods. One end of the extractor rods is secured to the moving flange with a washer and a nut, and the other end is placed against the bound bolts. A jack bolt passes through the moving flange such that the end of it is placed against the stationary flange. As the jack bolt is tightened, the moving flange moves away from the stationary flange and the extractor rods apply pressure to the bound bolts. This process is continued until the bolts are freed. The hand tool for extracting bolts is small, simple to use, and greatly reduces the amount of time and effort required to remove bound bolts from motor vessel shaft couplings and other flanged assemblies located in tight, confined areas.

20 Claims, 4 Drawing Sheets

HAND TOOL FOR EXTRACTING BOLTS

BACKGROUND OF THE INVENTION

1. Field of the Invention

The present invention relates to a hand tool for use in connection with extracting bolts from motor vessel shaft couplings. The hand tool for extracting bolts has particular utility in connection with the removal of bound or frozen bolts from motor vessel shaft couplings and related applications.

2. Description of the Prior Art

Hand tools for extracting bolts are desirable for aiding in the removal of bound or frozen bolts. Without a tool, this process can be time consuming and lead to injuries due to the amount of pressure that is applied when one attempts to remove a bound bolt.

The use of pulling tools is known in the prior art. For example, U.S. Pat. No. 1,456,735 to George L. Hunt discloses a gear puller that utilizes a pair of hooks to remove gears or wheels from their shafts or axles. Although the Hunt '735 patent utilizes a jack screw to produce the required force for gear removal, it does not disclose a device that could be used to remove a bound bolt since there is no room to insert the hooks around the bolt, and has the further drawback of not providing a means to stabilize the device against a shaft during usage, leading to slippage and possible injury.

U.S. Pat. No. 1,043,400 to George A. Collison discloses a wheel puller that could be used to remove wheels, especially automobile wheels, from their axles. However, since the Collison '400 patent discloses a device that utilizes a pair of hooks to remove the wheels, this device would not be useful in removing bound bolts because there is no space for the hooks to be placed around the bolts. Additionally, the Collison '400 device does not provide a means to stabilize the device against a shaft during usage, potentially leading to injury during use of the device.

Likewise, U.S. Pat. No. 2,188,074 to Ernest E. Condon discloses a wheel puller that is similar in function and design to both the Hunt '735 and Collison '400 patents. Like the Hunt '735 and Collison '400 devices, the Condon'074 device does not provide a means for removing bound bolts since the hooks can not be placed on the bolt, and can not be stabilized against a shaft for secure positioning during usage.

Similarly, U.S. Pat. No. 4,649,615 to Kenn W. Hundley discloses a complete puller tool that can remove a variety of components such as gears, wheels, harmonic balancers and Pitman arms from their respective shafts. However, the Hundley '615 device must have space around the component in order to be utilized. Thus, it would not be useful in removing bound bolts from a motor vessel shaft coupling since the bound bolt is encased in the coupling. Additionally, no means for stabilizing the Hundley '615 device against a motor shaft is provided.

U.S. Pat. No. 5,390,404 to Michael Rubino, Michael Berg, and Carol Rubino discloses a pulling tool that can be used to pull a rotor from a motor shaft or a fan from a shaft. However, as in the previous devices, the Rubino, et al '404 device relies on hooks which are clamped around the object to be pulled. Therefore, this device would not be useful for extracting bound bolts because there would be no way for the hooks to engage the bound bolt. Like the previously discussed devices, no means for stabilizing the device against a shaft during operation is provided.

Lastly, U.S. Pat. No. Des. 256,544 to Grant F. Hintze discloses the ornamental design for a washer spin tube puller. However, the Hintze '544 device would not be useful for extracting bound bolts since it does not provide any means to engage a bound bolt, and has the additional deficiency of not providing sufficient pressure to extract a bound bolt.

While the above-described devices fulfill their respective, particular objectives and requirements, the aforementioned patents do not describe a hand tool for extracting bound bolts that allows the user to safely and easily extract bound, or frozen, bolts from motor vessel shaft couplings. The Hunt '735, Collison '400, Condon'074, Hundley '615, Rubino, et al '404, and Hintze '544 patents rely on devices that must be placed around the outer edges of the components to be removed. Additionally, none of the aforementioned devices can be stabilized against a shaft during use, which could lead to potential injury or damage to the device in a fall. Finally, the Hintze '544 device could not provide the required force to extract a bound bolt.

Therefore, a need exists for a new and improved hand tool for extracting bolts that can be used to remove bound bolts from motor vessel shaft couplings and other similar places. In this regard, the present invention substantially fulfills this need. In this respect, the hand tool for extracting bound bolts according to the present invention substantially departs from the conventional concepts and designs of the prior art, and in doing so provides an apparatus primarily developed for the purpose of removing bound bolts from the couplings in which they reside.

SUMMARY OF THE INVENTION

In view of the foregoing disadvantages inherent in the known types of hand tools for extracting bolts now present in the prior art, the present invention provides an improved hand tool for extracting bolts, and overcomes the above-mentioned disadvantages and drawbacks of the prior art. As such, the general purpose of the present invention, which will be described subsequently in greater detail, is to provide a new and improved hand tool for extracting bolts which has all the advantages of the prior art mentioned heretofore and many novel features that result in a hand tool for extracting bolts which is not anticipated, rendered obvious, suggested, or even implied by the prior art, either alone or in any combination thereof.

To attain this, the present invention essentially comprises a dual bolt extractor consisting of a two part, heavy steel main element. The front, or extraction, part has two housings for the bolts that are to be extracted. Above each housing is a passage tube with a stabilization bushing for the extraction rods, which allows free movement of the extraction rods during operation. Four stabilization rods join the front extraction unit to the rear jacking unit. A jacking bolt is attached to the jacking unit to apply pressure to the extraction rods that will transfer this pressure to the bolts which are being extracted.

A second embodiment of this invention uses a hydraulic jack to supply the pressure necessary to extract the bolts. Additionally, the invention could be constructed such that only a single bolt extraction is addressed. This single bolt extractor could be produced with either the jack bolt or the hydraulic jack to supply the necessary pressure on the extraction rods.

There has thus been outlined, rather broadly, the more important features of the invention in order that the detailed description thereof that follows may be better understood and in order that the present contribution to the art may be better appreciated.

The invention may also include spacers which are placed between the ends of the extraction rods and the bolts to be extracted for further leverage on the bolts. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand tool for extracting bolts that has all of the advantages of the prior art hand tools for extracting bolts and none of the disadvantages.

It is another object of the present invention to provide a new and improved hand tool for extracting bolts that may be easily and efficiently manufactured and marketed.

An even further object of the present invention is to provide a new and improved hand tool for extracting bolts that has a low cost of manufacture with regard to both materials and labor, and which accordingly is then susceptible of low prices of sale to the consuming public, thereby making such a hand tool for extracting bolts economically available to the buying public.

Still another object of the present invention is to provide a new hand tool for extracting bolts that provides in the apparatuses and methods of the prior art some of the advantages thereof, while simultaneously overcoming some of the disadvantages normally associated therewith.

Even still another object of the present invention is to provide a hand tool for extracting bolts for the extraction of bolts from motor vessel shaft couplings, especially in cramped spaces. This allows bound bolts to be removed safely, quickly, and easily, reducing the time, effort, and danger of this task.

Lastly, it is an object of the present invention to provide a new and improved hand tool for extracting bolts that could be produced in a hydraulically actuated format.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
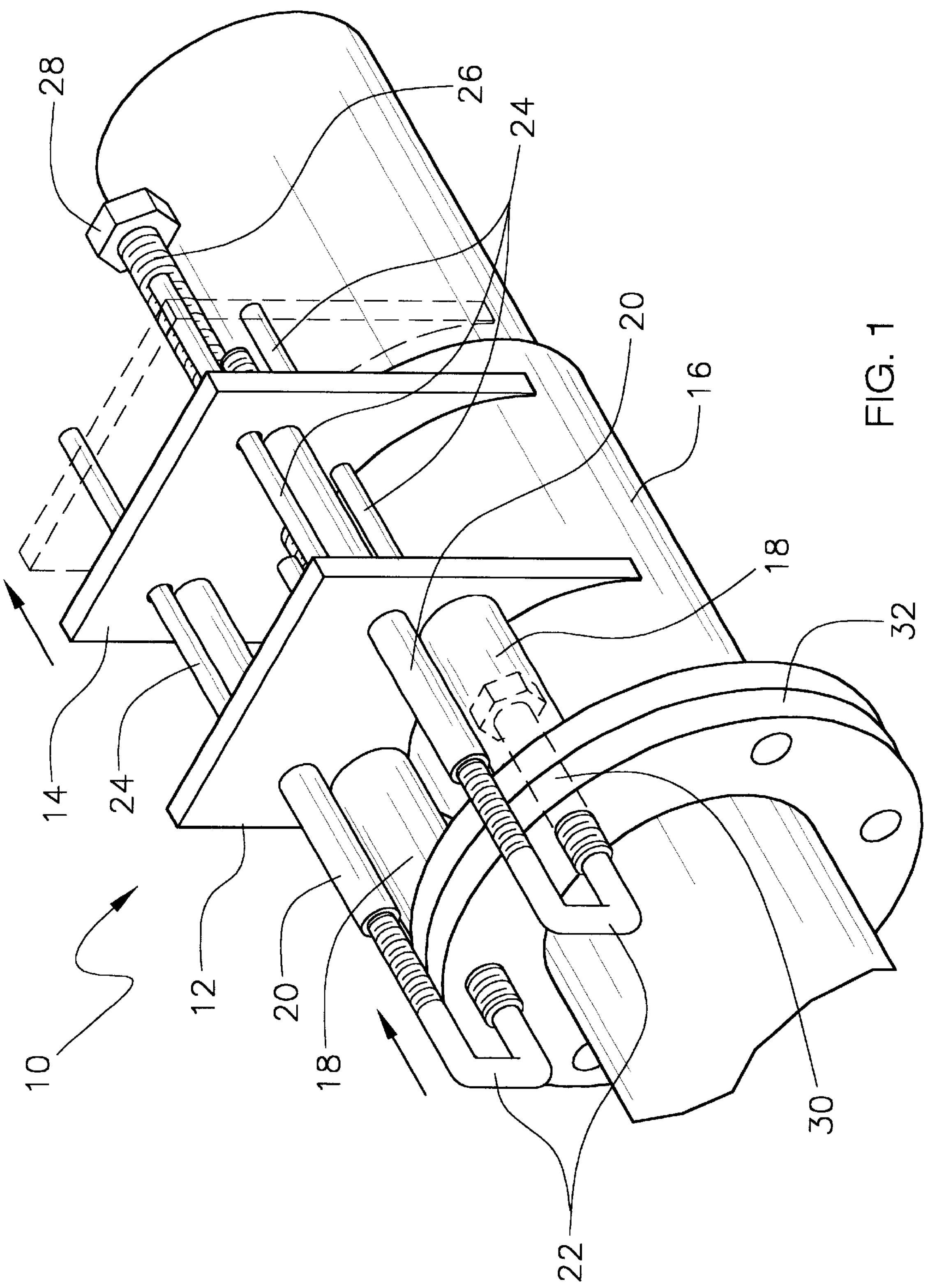
FIG. 1 is a right side perspective view of the preferred embodiment of the hand tool for extracting bolts constructed in accordance with the principles of the present invention.

Referring now to the drawings, and particularly to FIGS. 1–5, a preferred embodiment of the hand tool for extracting bolts of the present invention is shown and generally designated by the reference numeral 10.

In FIG. 1, a new and improved hand tool for extracting bolts 10 of the present invention for removing bound bolts is illustrated and will be described. More particularly, the hand tool for extracting bolts 10 has a stationary flange 12 and a moving flange 14, each of which is formed on the bottom to sit on the circular drive shaft 16 of an engine. Projecting from the front of the stationary flange 12 are two extraction bolt housings 18 which house the bolts that are to be extracted. Above each extraction bolt housing 18 is an extraction rod housing 20 through which two 180 degree extractor rods 22 move freely during operation. The extractor rods must be made of a very strong alloy due to the extreme pressure to which they are subjected during operation. The extraction rod housings 20 extend back such that they pass through the stationary flange 12 and the moving flange 14. Located between the rear side of the stationary flange 12 and the front side of the moving flange 14 are four guide rods 24 that pass through and extend beyond the rear side of the moving flange 14. A jack rod 26 and bolt 28 are applied to the rear side of the moving flange 14 to begin the process of removing a bound bolt 30 from the engine flange 32.

Figure 2:
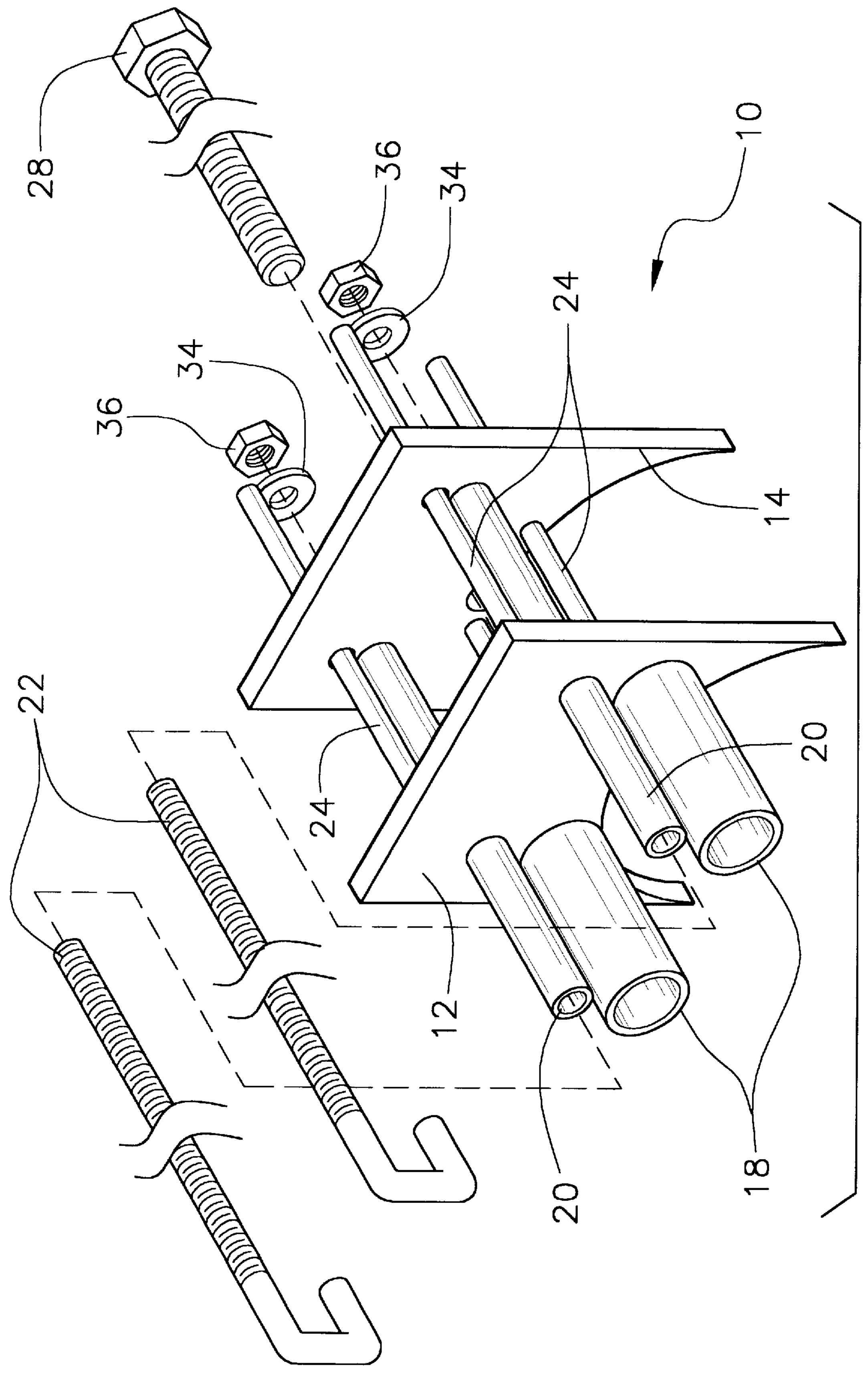
FIG. 2 is an exploded view of the hand tool for extracting bolts of the present invention.

FIG. 2 is an exploded view of the hand tool for extracting bolts. The nature of the 180 degree extractor rods 22 can now be seen. The extractor rods 22 are held in place by an extractor washer 34 and an extractor nut 36 which are tightened to hold the straight end of the extractor rods 22 to the back side of the moving flange 14. The extraction rod housings 20 are formed such that they have stabilization bushings 38.

Figure 3:
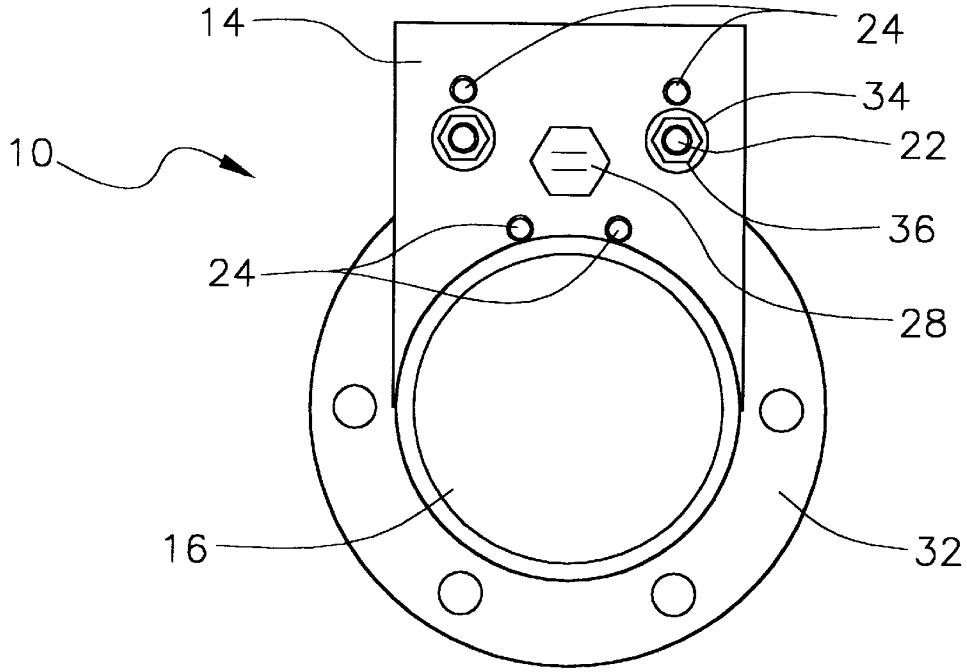
FIG. 3 is a rear side view of the hand tool for extracting bolts of the present invention.

FIG. 3 is a rear side view of the hand tool for extracting bolts. The placement of the four guide rods 24 in relation to the extractor rod nuts 22 and the jack bolt 28 can be seen. The ability of the moving flange 14 and the stationary flange 12 of FIG. 1 to rest in a stable position on the drive shaft 16 is due to the curved bottom of the flanges, 12 and 14.

Figure 4:
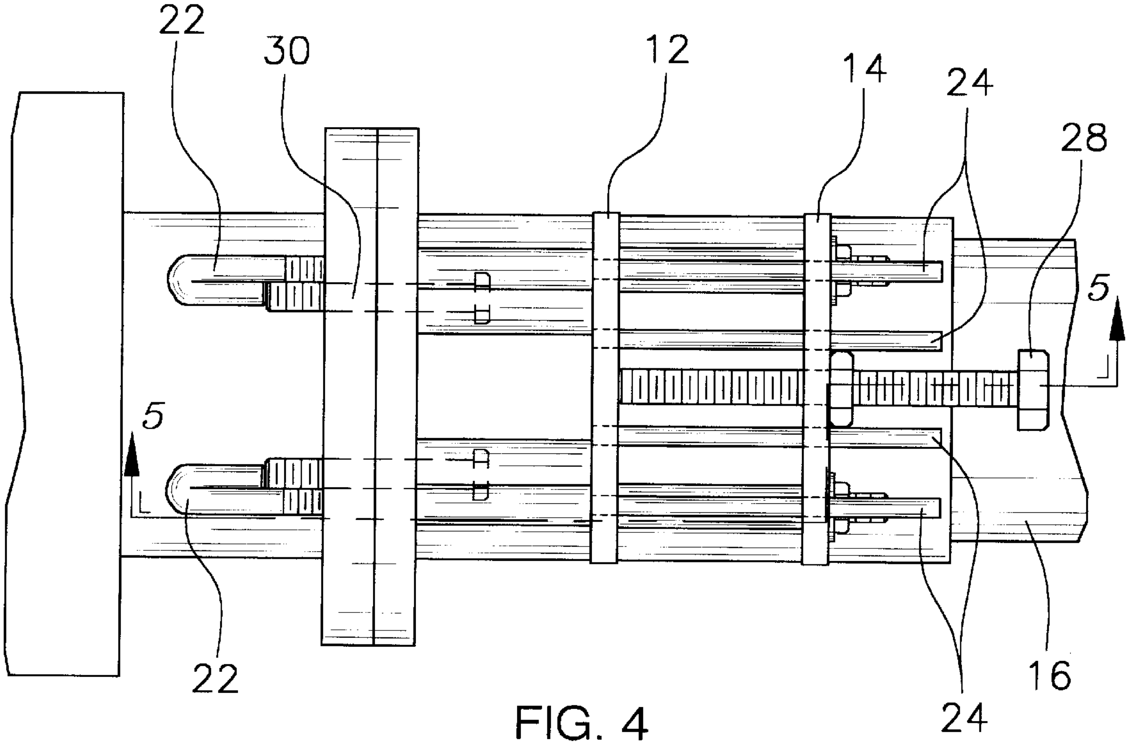
FIG. 4 is a top side view of the hand tool for extracting bolts of the present invention.

FIG. 4 is a top side view of the hand tool for extracting bolts. This view shows the placement of the two extractor rods 22 in relation to one another and to the jack bolt 28.

Figure 5:
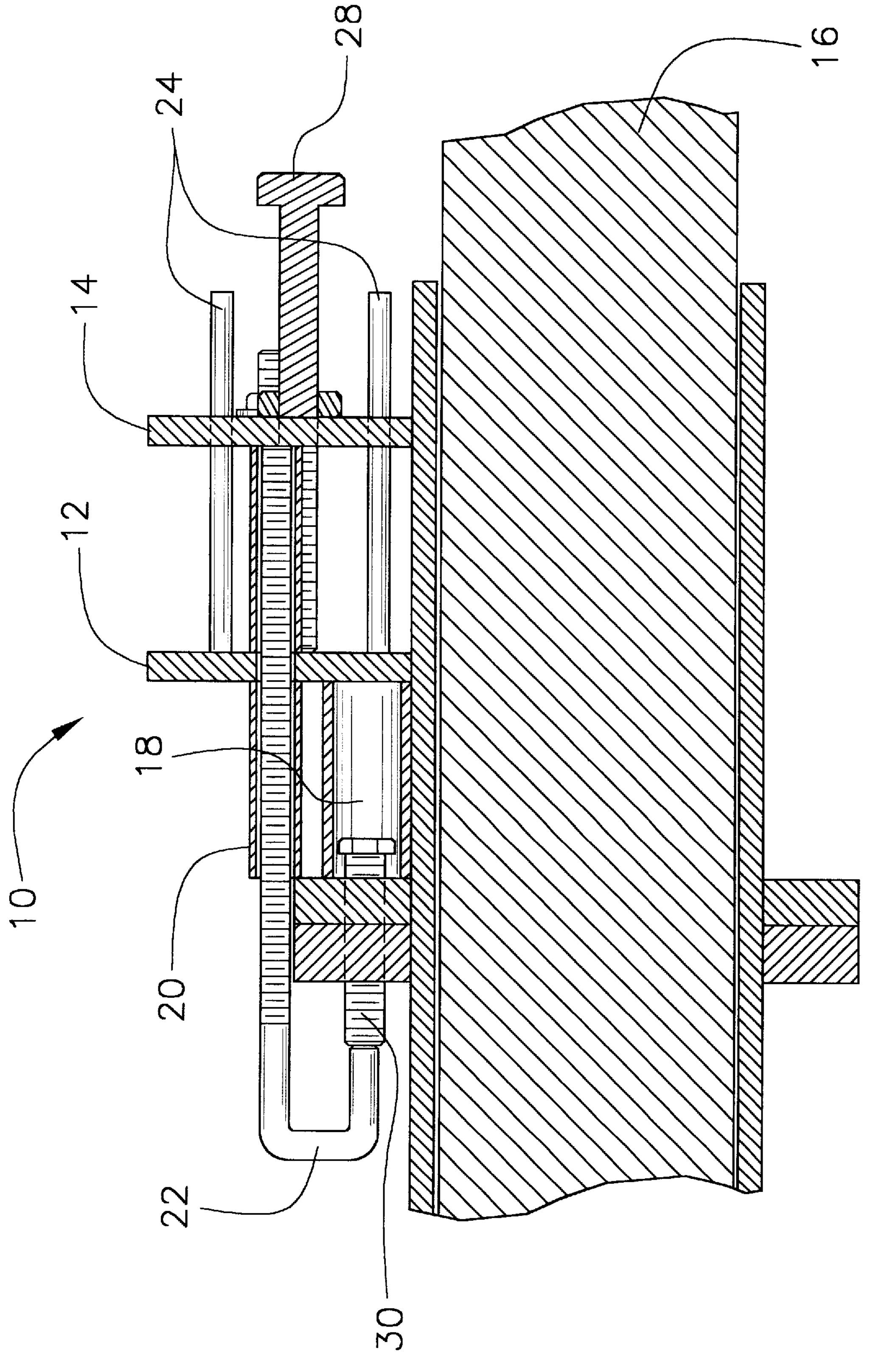
FIG. 5 is a right side sectional view of the hand tool for extracting bolts of the present invention.

FIG. 5 is a right side sectional view of the hand tool for extracting bolts. The jack bolt 28 is shown engaged with the moving flange 14 such that as it pulls the flange backwards, the extractor rods 22 push the bound bolt 30 into the extraction bolt housing 18.

In use, it can now be understood that the extractor rods 22 are placed on the end of the bound bolts 30 that will be extracted. The extractor rods 22 are routed through the extraction rod housings 20 and stabilization bushings 38. At the end of the extractor rods 22, the extractor washers 34 and extractor nuts 36 are snugly tightened against the moving flange 14. In order to extract the bound bolts 30, the jack bolt 28 is screwed into the center of the moving flange 14, until pressure is applied to the rear side of the stationary flange 12. As the jack bolt 28 continues to be tightened, it causes the extractor rods 22 to force the bound bolts 30 into the extraction bolt housings 18. As the extractor rods 22 continue to push the bound bolts 30 into the extraction bolt housings 18, they reach a point where the hooked ends meet the engine flange 32. At this point, the extractor rods 22 are not able to push the bound bolts 30 any further into the extraction bolt housings 18. Therefore, the extractor rods 22 are released and spacers are placed between the ends of the extractor rods 22 and the bound bolts 30. Different sized spacers, ranging in size from ½ to 5 inches, can be used depending upon how much further the bound bolts 30 must be moved. The jack bolt 28 is again tightened until the bound bolts 30 are completely removed from the engine flange 32.

The hand tool for extracting bolts could also be produced in a hydraulically actuated format by installing a hydraulic jack between the stationary and moving flanges. The hydraulic jack would perform the same function as the jack bolt.

While a preferred embodiment of the hand tool for extracting bolts has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the tool could be configured to have only a single extractor rod. Also, a hydraulic jack could be used in place of the jack bolt described. And although extracting bound bolts from marine vessel shaft couplings has been described as the main function, it should be appreciated that the hand tool for extracting bolts herein described is also suitable for extracting bolts from other engines, equipment, and machinery.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand tool for extracting bolts comprising:

a stationary plate having a front surface and a rear surface and formed such that a plurality of transverse apertures exist which run from said front surface to said rear surface;

a plurality of rods having two ends and attached to said rear surface of said stationary plate;

a sliding plate existing in a parallel plane to said stationary plate and having a front surface and a rear surface and formed such that a plurality of transverse apertures exist which run from said front surface to said rear surface, at least one said aperture being threaded, such that said opposite end of said rods pass through said non-threaded apertures at said front surface and extend beyond said rear surface in a direction perpendicular to said sliding plate;

a plurality of cylindrical rod housings having two ends and formed such that an aperture exists along the longitudinal axis and extends along the entire length of said rod housing, said rod housings connected on said end to said sliding plate at said non-threaded transverse apertures and passing through said stationary plate at said transverse apertures and extending on said opposite end beyond said front surface of said stationary plate in a direction perpendicular to said stationary plate;

a plurality of bolt housings having two ends and formed such that an aperture exists along the longitudinal axis and extends along the entire length of said bolt housing, said bolt housings connected on said end to said front surface of said stationary plate and extending on said opposite end away from said front surface of said stationary plate in a direction perpendicular to said stationary plate;

a jack bolt having a rod, a rod end, and a bolt end and placed such that said rod passes through said threaded transverse aperture in said sliding plate and said rod end contacts said stationary plate and said bolt end extends away from said rear surface of said sliding plate in a direction perpendicular to said sliding plate;

a plurality of cylindrical extractor rods having a main body and two ends and of such diameter that said rods pass through said cylindrical rod housings and are attached to said rear surface of said sliding plate by a connector.

2. The hand tool for extracting bolts of claim 1 wherein said stationary plate and said sliding plate are of the same shape and have a top, right, left, and bottom side and are formed such that said top, right and left sides are straight and said bottom side is inwardly arching such that said bottom side could rest on a cylindrical shape with stability.

3. The hand tool for extracting bolts of claim 1 wherein said cylindrical rod housings further comprise a stabilization bushing.

4. The hand tool for extracting bolts of claim 1 wherein said cylindrical extractor rods are formed such that said opposite end is angled 90 degrees from said main body and then is angled back another 90 degrees such that a hook member is formed and said opposite end travels in a parallel plane with said main body.

5. The hand tool for extracting bolts of claim 4 wherein said hook member of said cylindrical extractor rods is of such dimension that when said cylindrical extractor rods are placed in said cylindrical rod housings, the longitudinal axis of said opposite end of said cylindrical extractor rod is the same as the longitudinal axis of said bolt housings.

6. The hand tool for extracting bolts of claim 1 wherein said cylindrical extractor rods are threaded on said end that is attached to said rear surface of said sliding plate.

7. The hand tool for extracting bolts of claim 6 wherein said connector that connects said threaded end of said cylindrical extractor rods to said rear surface of said sliding plate comprises a nut and a washer.

8. A hand tool for extracting bolts comprising:

a stationary plate having a front surface and a rear surface and formed such that a plurality of transverse apertures exist which run from said front surface to said rear surface;

a plurality of rods having two ends and attached to said rear surface of said stationary plate;

a sliding plate existing in a parallel plane to said stationary plate and having a front surface and a rear surface and formed such that a plurality of transverse apertures exist which run from said front surface to said rear surface, at least one said aperture being threaded, such that said opposite end of said rods pass through said non-threaded apertures at said front surface and extend beyond said rear surface in a direction perpendicular to said sliding plate;

a plurality of cylindrical rod housings having two ends and formed such that an aperture exists along the longitudinal axis and extends along the entire length of said rod housing, said rod housings connected on said end to said sliding plate at said non-threaded transverse apertures and passing through said stationary plate at said transverse apertures and extending on said opposite end beyond said front surface of said stationary plate in a direction perpendicular to said stationary plate;

a plurality of bolt housings having two ends and formed such that an aperture exists along the longitudinal axis and extends along the entire length of said bolt housing, said bolt housings connected on said end to said front surface of said stationary plate and extending on said opposite end away from said front surface of said stationary plate in a direction perpendicular to said stationary plate;

a hydraulic jack attached to said rear surface of said stationary plate;

a plurality of cylindrical extractor rods having a main body and two ends and of such diameter that said rods pass through said cylindrical rod housings and are attached to said rear surface of said sliding plate by a connector.

9. The hand tool for extracting bolts of claim 8 wherein said stationary plate and said sliding plate are of the same shape and have a top, right, left, and bottom side and are formed such that said top, right and left sides are straight and said bottom side is inwardly arching such that said bottom side could rest on a cylindrical shape with stability.

10. The hand tool for extracting bolts of claim 8 wherein said cylindrical extractor rods are formed such that said opposite end is angled 90 degrees from said main body and then is angled back another 90 degrees such that a hook member is formed and said opposite end travels in a parallel plane with said main body.

11. The hand tool for extracting bolts of claim 10 wherein said hook member of said cylindrical extractor rods is of such dimension that when said cylindrical extractor rods are placed in said cylindrical rod housings, the longitudinal axis of said opposite end of said cylindrical extractor rod is the same as the longitudinal axis of said bolt housings.

12. The hand tool for extracting bolts of claim 8 wherein said cylindrical extractor rods are threaded on said end that is attached to said rear surface of said sliding plate.

13. The hand tool for extracting bolts of claim 12 wherein said connector that connects said threaded end of said cylindrical extractor rods to said rear surface of said sliding plate comprises a nut and a washer.

14. The hand tool for extracting bolts of claim 8 wherein said cylindrical extractor rod is threaded on said end that is attached to said rear surface of said sliding plate and said connector that connects said threaded end of said cylindrical extractor rod to said rear surface of said sliding plate comprises a nut and a washer.

15. A hand tool for extracting bolts comprising:

a stationary plate having a front surface and a rear surface and formed such that a plurality of transverse apertures exist which run from said front surface to said rear surface;

a plurality of rods having two ends and attached to said rear surface of said stationary plate;

a sliding plate existing in a parallel plane to said stationary plate and having a front surface and a rear surface and formed such that a plurality of transverse apertures exist which run from said front surface to said rear surface, at least one said aperture being threaded, such that said opposite end of said rods pass through said non-threaded apertures at said front surface and extend beyond said rear surface in a direction perpendicular to said sliding plate;

a cylindrical rod housing having two ends and formed such that an aperture exists along the longitudinal axis and extends along the entire length of said rod housing, said rod housing connected on said end to said sliding plate at said non-threaded transverse apertures and passing through said stationary plate at said transverse apertures and extending on said opposite end beyond said front surface of said stationary plate in a direction perpendicular to said stationary plate;

a bolt housing having two ends and formed such that an aperture exists along the longitudinal axis and extends along the entire length of said bolt housing, said bolt housing connected on said end to said front surface of said stationary plate and extending on said opposite end away from said front surface of said stationary plate in a direction perpendicular to said stationary plate;

a jacking means attached to said stationary and said sliding plates;

a cylindrical extractor rod having a main body and two ends and of such diameter that said rod pass through said cylindrical rod housing and is attached to said rear surface of said sliding plate by a connector.

16. The hand tool for extracting bolts of claim 15 wherein said stationary plate and said sliding plate are of the same shape and have a top, right, left, and bottom side and are formed such that said top, right and left sides are straight and said bottom side is inwardly arching such that said bottom side could rest on a cylindrical shape with stability.

17. The hand tool for extracting bolts of claim 15 wherein said jacking means further comprises:

a jack bolt having a rod, a rod end, and a bolt end and placed such that said rod passes through said threaded transverse aperture in said sliding plate and said rod end contacts said stationary plate and said bolt end extends away from said rear surface of said sliding plate in a direction perpendicular to said sliding plate.

18. The hand tool for extracting bolts of claim 15 wherein said jacking means further comprises:

a hydraulic jack attached to said rear surface of said stationary plate and placed such that said hydraulic jack pushes against said sliding plate while said hydraulic jack is in operation.

19. The hand tool for extracting bolts of claim 15 wherein said cylindrical extractor rod is formed such that said opposite end is angled 90 degrees from said main body and then is angled back another 90 degrees such that a hook member is formed and said opposite end travels in a parallel plane with said main body.

20. The hand tool for extracting bolts of claim 17 wherein said hook member of said cylindrical extractor rod is of such dimension that when said cylindrical extractor rod is placed in said cylindrical rod housing, the longitudinal axis of said opposite end of said cylindrical extractor rod is the same as the longitudinal axis of said bolt housing.

* * * * *